(12) United States Patent
Zheng (10) Patent No.: US 9,516,224 B2
(45) Date of Patent: Dec. 6, 2016

(54) NAVIGATION DEVICE (71) Applicant: NVIDIA Corporation, Santa Clara, CA (US)

(72) Inventor: Wenjie Zheng, Shenzhen (CN)

(73) Assignee: NVIDIA CORPORATION, Santa Clara, CA (US)

(*) Notice: Subject to any disclaimer, the term of this patent is extended or adjusted under 35 U.S.C. 154(b) by 250 days.

(21) Appl. No.: 13/677,128

(22) Filed: Nov. 14, 2012

(65) Prior Publication Data

US 2013/0120524 A1 May 16, 2013

(30) Foreign Application Priority Data

Nov. 14, 2011 (CN) .......................... 2011 1 0358476

(51) Int. Cl.
H04N 7/00 (2011.01)
H04N 5/232 (2006.01)

(52) U.S. Cl.
CPC .................................. H04N 5/23238 (2013.01)

(58) Field of Classification Search
USPC ............. 348/36, 39, 47, 48, 54, 61, 78, 113, 348/118, 143, 148, 153, 159, 239, 348/333.01, 333.06, 369, 473, 837
See application file for complete search history.

(56) References Cited

U.S. PATENT DOCUMENTS

| 2,007,873 | A | 7/1935 | Paulin |
| 2,704,225 | A | 3/1955 | Anschuetz et al. |
| 2,939,742 | A | 6/1960 | Dardarian et al. |
| 3,715,541 | A | 2/1973 | Koenig |
| 3,761,658 | A | 9/1973 | Loose et al. |
| 3,845,261 | A | 10/1974 | Blinkilde |
| 3,859,485 | A | 1/1975 | Blinkilde et al. |
| 4,107,645 | A | 8/1978 | Lewis et al. |
| 4,238,778 | A | 12/1980 | Ohsumi |

(Continued)

FOREIGN PATENT DOCUMENTS

| CN | 1637385 A | 7/2005 |
| CN | 101689292 A | 3/2010 |

(Continued)

OTHER PUBLICATIONS

U.S. Appl. No. 08/143,877, filed Oct. 28, 1993, "Vehicle Paging Display System".

(Continued)

Primary Examiner — Jefferey Harold
Assistant Examiner — Mustafizur Rahman (57) ABSTRACT In one embodiment, a car navigation device is provided. The device comprises: at least one wide-angle camera; a video correction unit for acquiring video data from the wide-angle lens and correcting the video data; a video merging unit for acquiring corrected video data from video correction unit and merging the corrected video data; an image recognition unit for acquiring video from the video merging unit and performing image recognition to the video; and a driving assistant unit for acquiring data from the image recognition unit and assisting driving in accordance with the recognized content. The navigation device provided by various embodiments in accordance with the present invention can correct and recognize the images taken by fisheye lens in real-time so as to assist the driver for driving or drive the car automatically without a human being.

20 Claims, 5 Drawing Sheets

(56) References Cited

U.S. PATENT DOCUMENTS

| | | |
|---|---|---|
| 4,300,116 A | 11/1981 | Stahovec |
| 4,423,294 A | 12/1983 | Walser et al. |
| 4,489,302 A | 12/1984 | Eventoff |
| 4,515,999 A | 5/1985 | Harper |
| 4,528,563 A | 7/1985 | Takeuchi |
| 4,720,133 A | 1/1988 | Alexander et al. |
| 4,796,191 A | 1/1989 | Honey et al. |
| 4,854,634 A | 8/1989 | Shiraishi et al. |
| 4,953,305 A | 9/1990 | Van Lente et al. |
| 4,958,882 A | 9/1990 | Kolb |
| 5,195,798 A | 3/1993 | Klein et al. |
| 5,225,747 A | 7/1993 | Helms et al. |
| 5,278,547 A | 1/1994 | Suman et al. |
| 5,289,184 A | 2/1994 | Suzuki |
| 5,297,430 A | 3/1994 | Sonderegger et al. |
| 5,305,644 A | 4/1994 | Ehrreich |
| 5,313,189 A | 5/1994 | Dodd et al. |
| 5,345,382 A | 9/1994 | Kao |
| 5,359,529 A | 10/1994 | Snider |
| RE34,773 E | 11/1994 | Dombrowski |
| 5,374,933 A | 12/1994 | Kao |
| 5,402,075 A | 3/1995 | Lu et al. |
| 5,404,128 A | 4/1995 | Ogino et al. |
| 5,471,389 A | 11/1995 | Hahlganss |
| 5,515,283 A | 5/1996 | Desai et al. |
| 5,555,172 A | 9/1996 | Potter |
| 5,602,526 A | 2/1997 | Read |
| 5,629,488 A | 5/1997 | Kropp |
| 5,635,924 A | 6/1997 | Tran et al. |
| 5,648,755 A | 7/1997 | Yagihashi |
| 5,654,615 A | 8/1997 | Brodsky |
| 5,821,935 A | 10/1998 | Hartman et al. |
| 5,847,704 A | 12/1998 | Hartman |
| 5,857,536 A | 1/1999 | Wieszt et al. |
| 5,871,063 A | 2/1999 | Young |
| 5,875,108 A | 2/1999 | Hoffberg et al. |
| 5,987,370 A | 11/1999 | Murphy et al. |
| 6,029,110 A | 2/2000 | Zuber et al. |
| 6,087,961 A | 7/2000 | Markow |
| 6,097,285 A | 8/2000 | Curtin |
| 6,101,436 A | 8/2000 | Fortune et al. |
| 6,138,067 A | 10/2000 | Cobb et al. |
| 6,181,996 B1 | 1/2001 | Chou et al. |
| 6,246,936 B1 | 6/2001 | Murphy et al. |
| 6,330,499 B1 | 12/2001 | Chou et al. |
| 6,587,770 B1 | 7/2003 | Gray et al. |
| 6,629,033 B2 | 9/2003 | Preston et al. |
| 6,684,176 B2 | 1/2004 | Willins et al. |
| 6,731,204 B2 | 5/2004 | Lehmann |
| 6,772,180 B1 | 8/2004 | Li et al. |
| 6,778,073 B2 | 8/2004 | Lutter et al. |
| 6,876,298 B2 | 4/2005 | Litkouhi et al. |
| 6,944,538 B2 | 9/2005 | Ishibashi et al. |
| 7,002,623 B1 | 2/2006 | Ohyama et al. |
| 7,146,260 B2 | 12/2006 | Preston et al. |
| 7,188,005 B2 | 3/2007 | Toba et al. |
| 7,649,444 B1 | 1/2010 | Fear et al. |
| 7,729,507 B1 | 6/2010 | Malachowsky |
| 8,395,657 B2 | 3/2013 | Jacob |
| 8,457,838 B1 | 6/2013 | Fear et al. |
| 2002/0087655 A1 | 7/2002 | Bridgman et al. |
| 2002/0113873 A1 | 8/2002 | Williams |
| 2002/0154213 A1* | 10/2002 | Sibyama et al. .............. 348/47 |
| 2003/0007793 A1* | 1/2003 | Suzuki ........................ 396/20 |
| 2004/0070675 A1 | 4/2004 | Fredlund et al. |
| 2005/0143911 A1* | 6/2005 | Ishibashi et al. ............. 701/209 |
| 2006/0023105 A1* | 2/2006 | Kostrzewski et al. ........ 348/335 |
| 2006/0066728 A1 | 3/2006 | Batur |
| 2006/0171007 A1 | 8/2006 | Chen et al. |
| 2006/0227212 A1 | 10/2006 | Schedivy |
| 2006/0232670 A1 | 10/2006 | Chu |
| 2006/0244829 A1* | 11/2006 | Kato et al. ................... 348/148 |
| 2007/0032912 A1 | 2/2007 | Jung et al. |
| 2007/0188895 A1 | 8/2007 | Thiel |
| 2008/0136923 A1 | 6/2008 | Inbar et al. |
| 2009/0113505 A1* | 4/2009 | Yu ............................... 725/114 |
| 2009/0128686 A1* | 5/2009 | Yamashita et al. .......... 348/369 |
| 2009/0160940 A1* | 6/2009 | Imamura ..................... 348/159 |
| 2009/0183168 A1* | 7/2009 | Uchida ........................ 718/104 |
| 2010/0002071 A1* | 1/2010 | Ahiska ......................... 348/36 |
| 2010/0053325 A1* | 3/2010 | Inagaki ........................ 348/143 |
| 2010/0097526 A1* | 4/2010 | Jacob .......................... 348/578 |
| 2010/0253861 A1* | 10/2010 | Tomaru et al. .............. 348/745 |
| 2010/0254602 A1* | 10/2010 | Yoshino ...................... 382/167 |
| 2011/0157331 A1* | 6/2011 | Jang ............................. 348/54 |
| 2011/0210868 A1* | 9/2011 | Yano et al. ................. 340/932.2 |

FOREIGN PATENT DOCUMENTS

| | | |
|---|---|---|
| WO | 02058402 | 7/2002 |
| WO | 2005016701 | 2/2005 |

OTHER PUBLICATIONS

U.S. Appl. No. 08/177,710, filed Jan. 5, 1994, "Remote Vehicle Programming System".

U.S. Appl. No. 60/117,595, filed Jan. 27, 1999, "Conversational Browser and Virtual Machine".

U.S. Appl. No. 08/099,207, filed Jul. 29, 1993, "Method for Selecting a Destination in a Vehicle Navigation System".

* cited by examiner

NAVIGATION DEVICE

CROSS-REFERENCE TO RELATED APPLICATION

This patent application claims the benefit and priority of the co-pending Chinese Patent Application No. 201110358476.9, filed on Nov. 14, 2011, by Wenjie ZHENG, Attorney Docket Number P2011174, which is hereby incorporated by reference in its entirety.

BACKGROUND

As we all know, the feature of a wide-angle camera is that the viewing angle is large and the visual field is wide. The scene taken by it from a viewing point is much larger than the scene seen by human eyes from the same viewing point. The scene depth is long and the scene range is large.

Figure 1A:
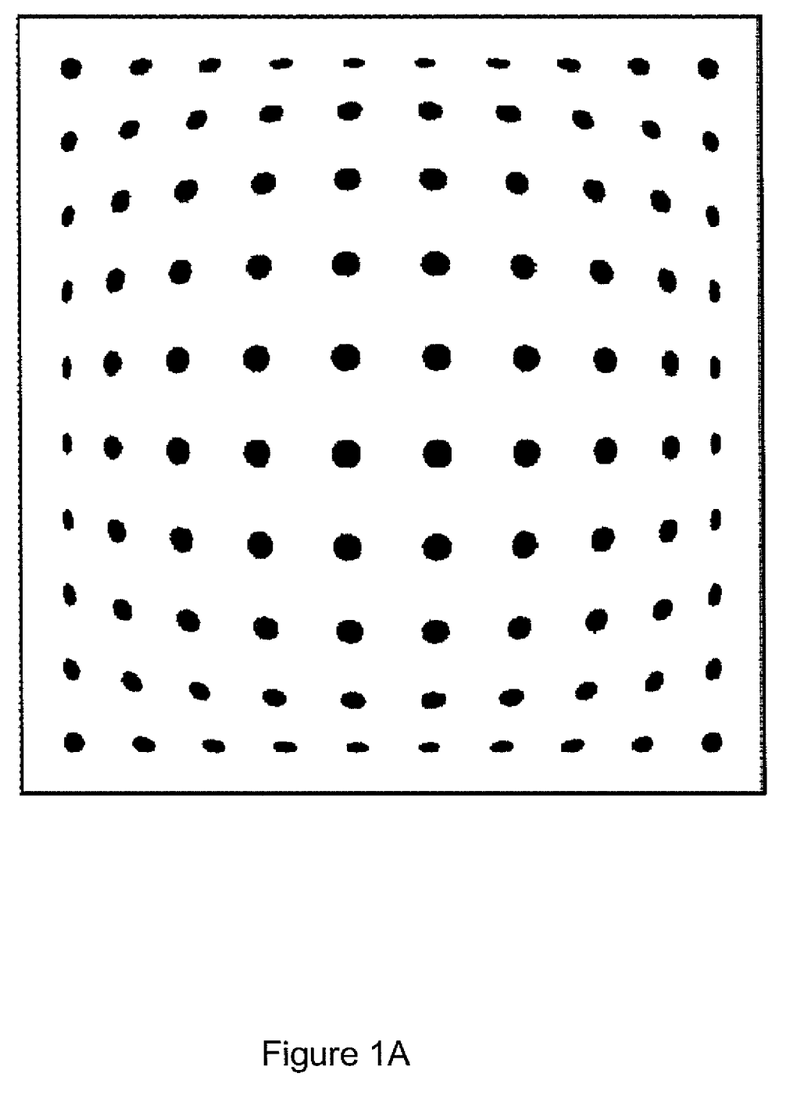
FIG. 1A illustrates an image taken by a wide-angle lens with barrel distortion.
Figure 1B:
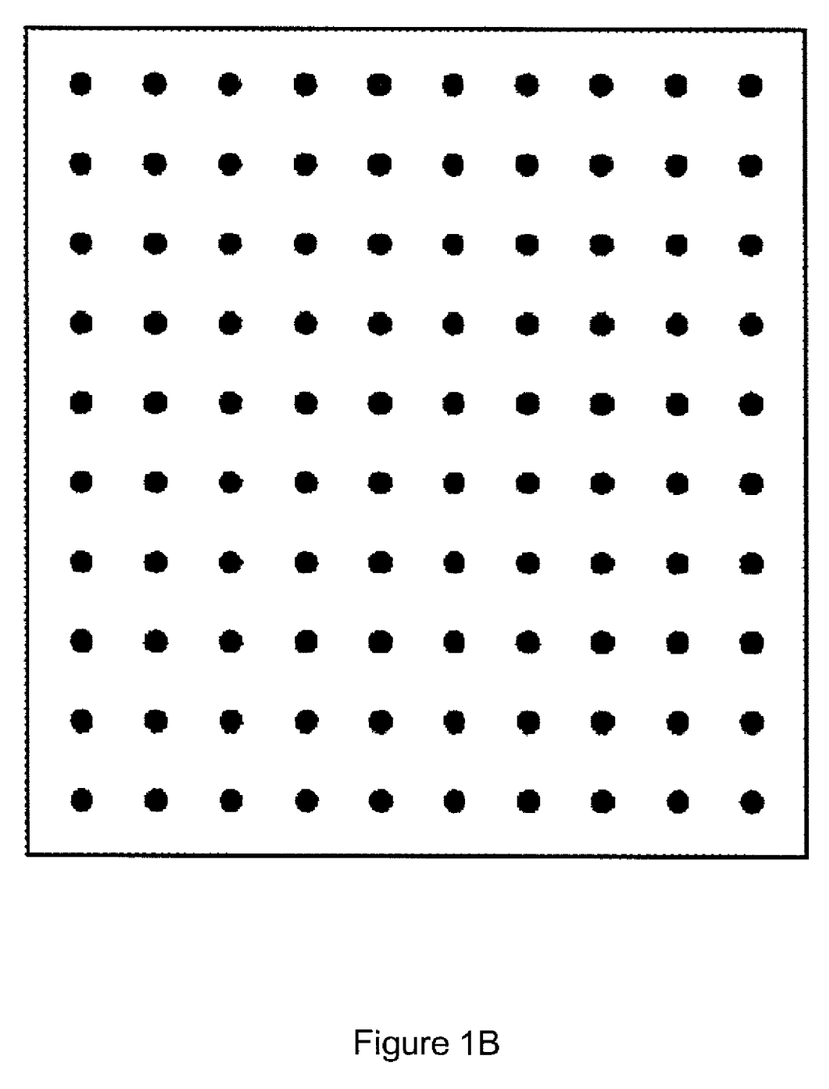
FIG. 1B illustrates the corrected image after the image with barrel distortion was processed.

However, all wide-angle cameras can cause barrel distortion to some extent, as shown in FIGS. 1A-1B, for example. FIG. 1A shows an image taken by a wide-angle lens with barrel distortion. FIG. 1B shows the corrected image after the image with barrel distortion was processed. Thus, all wide-angle cameras can cause barrel distortion to some extent. However, it is hard to obtain good image recognition with distorted images. So, it is needed to perform corrections to the distorted images.

A fisheye lens is a wide-angle lens and achieves over 180 degree wide angles of view, which is very useful in car navigation. Users can get the 360 degree video with only two cameras fixed with fisheye lens. The video needed by car navigation is a continual data flow and contains a lot of frames per second. If doing video correction, we must do the correction frame by frame. There is mass data to process in a short time, which need high reliability and quick response. However, there is no system in the prior art that can correct and recognize the images taken by fisheye lens in real-time for car navigation.

SUMMARY

Accordingly, there is a need in the art for a system and navigation device that can correct fisheye lens images in real-time so as to correct and recognize the images taken by fisheye lens in real-time for car navigation.

An embodiment in accordance with the present invention is related to a real-time video correction system for car navigation, the system comprising: at least one wide-angle camera for acquiring the full view of the scene around the car, a video correction unit for acquiring data from the wide-angle lens and correcting the video data with its computing capability being above 100 GFLOPS (giga floating-point operations per second), a 360 degree video merging unit for acquiring the video data from the video correction unit and merging the video data into full views of the scenes, and an image recognition unit for acquiring data from the 360 degree video merging unit and performing image recognition to the data.

Preferably, in an embodiment, the at least one wide-angle camera comprises: a first fish-eye camera for taking video of at least 180 degrees; and a second fish-eye camera for taking video of at least 180 degrees, wherein the first fish-eye camera and the second fish-eye camera are set in the position that they can take the full view of the scenes around the car.

Preferably, in an embodiment, the video correction unit comprises: a first fish-eye video correction module for acquiring data from the first fish-eye camera and correcting the inputted video data; and a second fish-eye video correction module for acquiring data from the second fish-eye camera and correcting the inputted video data.

Preferably, in an embodiment, the frame buffer of the video correction unit is 512 MB (megabytes) and above.

Preferably, in an embodiment, the frame buffer of the video correction unit uses graphics processing units.

Preferably, in an embodiment, the video correction unit supports CUDA™ 2.0 and above.

Preferably, in an embodiment, the computing ability of the image recognition unit is 100 GFLOPS and above.

Preferably, in an embodiment, the image recognition unit uses graphics processing units.

Preferably, in an embodiment, the image recognition unit supports CUDA 2.0 and above.

Preferably, in an embodiment, the frame buffer of the image recognition unit is 512 MB and above.

In another embodiment of the invention, a car navigation device is provided, the device comprises: at least one wide-angle camera for acquiring the full view of the scene around the car; a video correction unit for acquiring data from the wide-angle lens and correcting the video data with its computing capability being above 100 GFLOPS; a 360 degree video merging unit for acquiring video data from the video correction unit and merging the video data into full views of the scenes; image recognition unit for acquiring data from the 360 degree video merging unit and performing image recognition to the data; and a driving assistant unit for acquiring data from the image recognition unit and assisting driving in accordance with the recognized content.

Preferably, in an embodiment, the at least one wide-angle camera of the device comprises: a first fish-eye camera for taking video of at least 180 degrees; and a second fish-eye camera for taking video of at least 180 degrees, wherein the first fish-eye camera and the second fish-eye camera are set in the position that they can take the full view of the scenes around the car.

Preferably, in an embodiment, the video correction unit of the device comprises: a first fish-eye video correction module for acquiring data from the first fish-eye camera and correcting the inputted video data; and a second fish-eye video correction module for acquiring data from the second fish-eye camera and correcting the inputted video data.

Preferably, in an embodiment, the frame buffer of the video correction unit of the device is 512 MB and above.

Preferably, in an embodiment, the frame buffer of the video correction unit of the device uses graphics processing units.

Preferably, in an embodiment, the video correction unit of the device supports CUDA 2.0 and above.

Preferably, in an embodiment, the computing ability of the image recognition unit of the device is 100 GFLOPS and above.

Preferably, in an embodiment, the image recognition unit of the device uses graphics processing units.

Preferably, in an embodiment, the image recognition unit of the device supports CUDA 2.0 and above.

Preferably, in an embodiment, the frame buffer of the image recognition unit of the device is 512 MB and above.

The navigation device provided by various embodiments in accordance with the present invention can correct and recognize the images taken by fisheye lens in real-time so as to assist the driver for driving or it can be used to drive a car manlessly (or without a human being).

Additional features and advantages of various embodiments in accordance with the invention will be set forth in the description that follows, and in part will be apparent from the description, or may be learned by practice of various embodiments in accordance with the invention. The advantages of various embodiments in accordance with the invention can be realized and attained by the structure particularly pointed out in the written description and claims hereof as well as the appended drawings.

It is to be understood that both the foregoing general description and the following detailed description are exemplary and explanatory and are intended to provide further explanation of various embodiments in accordance with the invention as claimed.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings are included to provide a further understanding of various embodiments in accordance with the invention, and are incorporated in and constitute a part of this specification. The drawings illustrate various embodiments of the invention and, together with the description, serve to explain the principles of various embodiments in accordance with the invention. In the drawings.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details or with equivalents thereof. In other instances, well known methods, procedures, components, and circuits have not been described in detail as not to unnecessarily obscure aspects of the invention.

Various embodiments in accordance with the present invention relate generally to a car navigation device, in particular, to a car navigation device with wide-angle cameras.

Example embodiments are described herein in the context of a real-time video correction system for car navigation. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Reference will now be made in detail to preferred embodiments of the present invention, examples of which are illustrated in the accompanying drawings.

Figure 2:
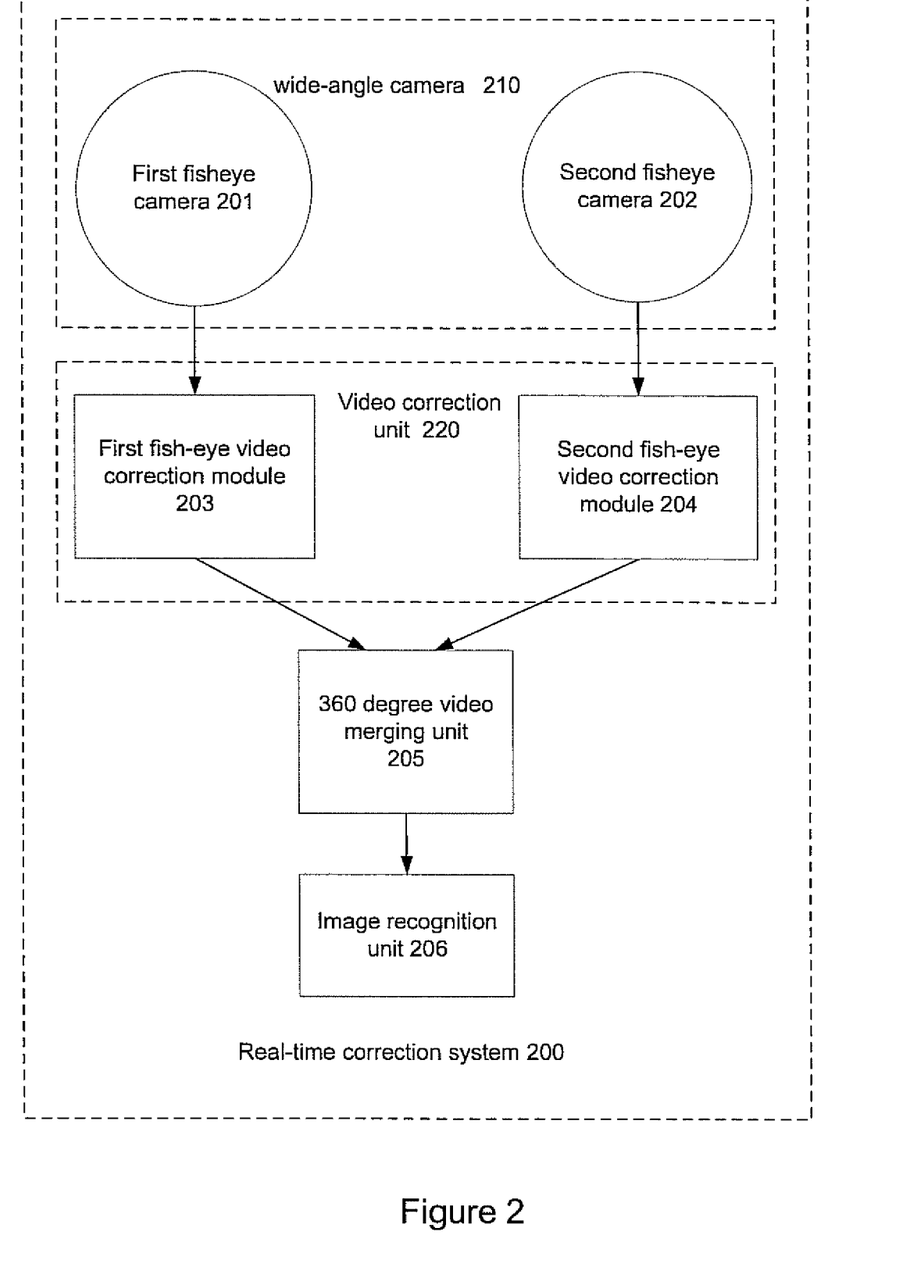
FIG. 2 illustrates a structure diagram of a real-time video correction system for car navigation provided by the present invention in accordance with one embodiment.

In another embodiment of the invention, a real-time video correction system for car navigation is provided which can correct the images taken by wide-angle cameras in real-time. FIG. 2 illustrates a structure diagram of a real-time video correction system 200 for car navigation provided by the present invention in accordance with one embodiment. The real-time video correction system 200 comprises at least one wide-angle camera 210, a video correction unit 220, a 360 degree video merging unit 205, and an image recognition unit 206.

In an embodiment, the at least one wide-angle camera 210 is used for taking the full view of the scene around a car. Preferably, in an embodiment, the lens of it can be at least two fisheye lenses for achieving wider angles of view. A fisheye lens is a wide-angle lens and achieves over 180 degree wide angles of view, which is very useful in car navigation. Users can get the 360 degree video with only two cameras fixed with fisheye lens. As shown in FIG. 2, in an embodiment, the wide-angle camera 210 comprises a first fish-eye camera 201 and a second fish-eye camera 202. The first fish-eye camera 201 and the second fish-eye camera 202 are both fisheye lenses with more than 180 degree angles of view. And they are set in the position that they can take the full view of the scenes around the car.

In an embodiment, the video correction unit 220 is used for acquiring data from the wide-angle lens and correcting the video data. As the car navigation system is a real-time system, it needs high reliability and quick response. As a result, high parallel arithmetic capability is needed to process the real-time video. The computing capability of the video correction unit 220 provided by an embodiment in accordance with the present invention is above 100 GFLOPS (giga floating-point operations per second). Preferably, in an embodiment, the video correction unit 220 comprises a first fish-eye video correction module 203 for acquiring data from the first fish-eye camera 201 and correcting the inputted video data and a second fish-eye video correction module 204 for acquiring data from the second fish-eye camera 202 and correcting the inputted video data. Preferably, in an embodiment, the frame buffer of the video correction unit of the device is 512 MB (megabytes) and above.

In an embodiment, the 360 degree video merging unit 205 is used for acquiring the corrected video data from the video correction unit 220 and merging the video data from the first fish-eye video correction module 203 and the second fish-eye video correction module 204, respectively, into 360 degree full views of the scenes and then transmits them to the image recognition unit 206. In an embodiment, a lot of video merging methods in the conventional art can be used by the 360 degree video merging unit 205. For example, in an embodiment, a video merging method of them can comprise the following steps: (a) the synchronous frames of the videos are made corresponding to each other; (b) feature points of the images are extracted after cylindrical coordinate transforming each set of synchronized video frames; and (c) each frame of the video stream are merged according to the feature points so as to form the full view video.

In an embodiment, image recognition unit 206 acquires data from the 360 degree video merging unit 205 and performs image recognition to the data using processors with high computing performance. In an embodiment, image recognition unit 206 is mainly used for recognizing the barriers, cars, and people in the full view video acquired from the 360 degree video merging unit 205.

Figure 3:
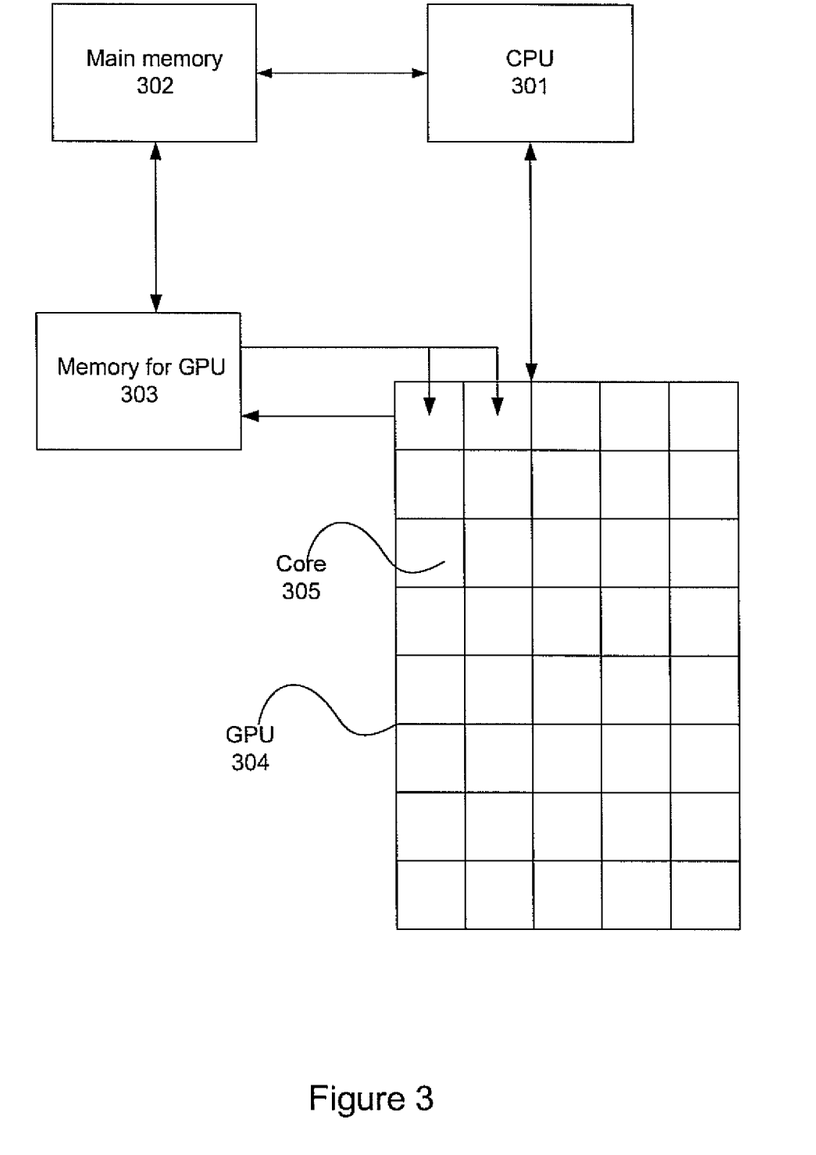
FIG. 3 illustrates a structure diagram of a real-time video correction system for car navigation provided by the present invention in accordance with one embodiment.

Preferably, in an embodiment, the video correction unit 220, the 360 degree video merging unit 205, and the image recognition unit 206 can be implemented by graphics processing units with good parallel computing capability. As shown in FIG. 3, a block diagram of the hardware that uses a graphics processing unit for parallel computing in accordance with one embodiment is illustrated. The hardware that uses a graphics processing unit for parallel computing generally comprises a CPU (central processing unit) 301, main memory 302, memory for GPU (graphics processing units) 303 and GPU 304. During the computing process, data are firstly copied from the main memory 302 to memory for GPU (graphics processing units) 303, and CPU 301 sends instructions to GPU 304 to instruct GPU 304 to perform computing process. Then GPU 304 perform computing process in the multiple cores 305 according to the instructions of CPU 301 and data in the memory for GPU 303, and transmits the computing results to the memory for GPU 303. Finally, data are copied from the memory for GPU 303 to the main memory 302. Since the GPU 304 has hundreds of cores 305 that can parallel perform computing, it has powerful parallel computing capabilities. Particularly, when the amount of data computing is much larger than data scheduling and data transmission, GPU can far exceed the traditional CPU in performance.

Further preferably, in an embodiment, the video correction unit 220, the 360 degree video merging unit 205, and the image recognition unit 206 can be implemented using the CUDA™ (Compute Unified Device Architecture) platform based on GPU. CUDA (Compute Unified Device Architecture) is a parallel computing architecture based on GPU and produced by NVIDIA. The computing performance of GPU can be greatly increased by using CUDA architecture so that GPU can solve very complex problems and its computing capability can be 100 GFLOPS and above. Therefore, it is suitable to correct and recognize the images taken by fisheye lens in real-time.

Figure 4:
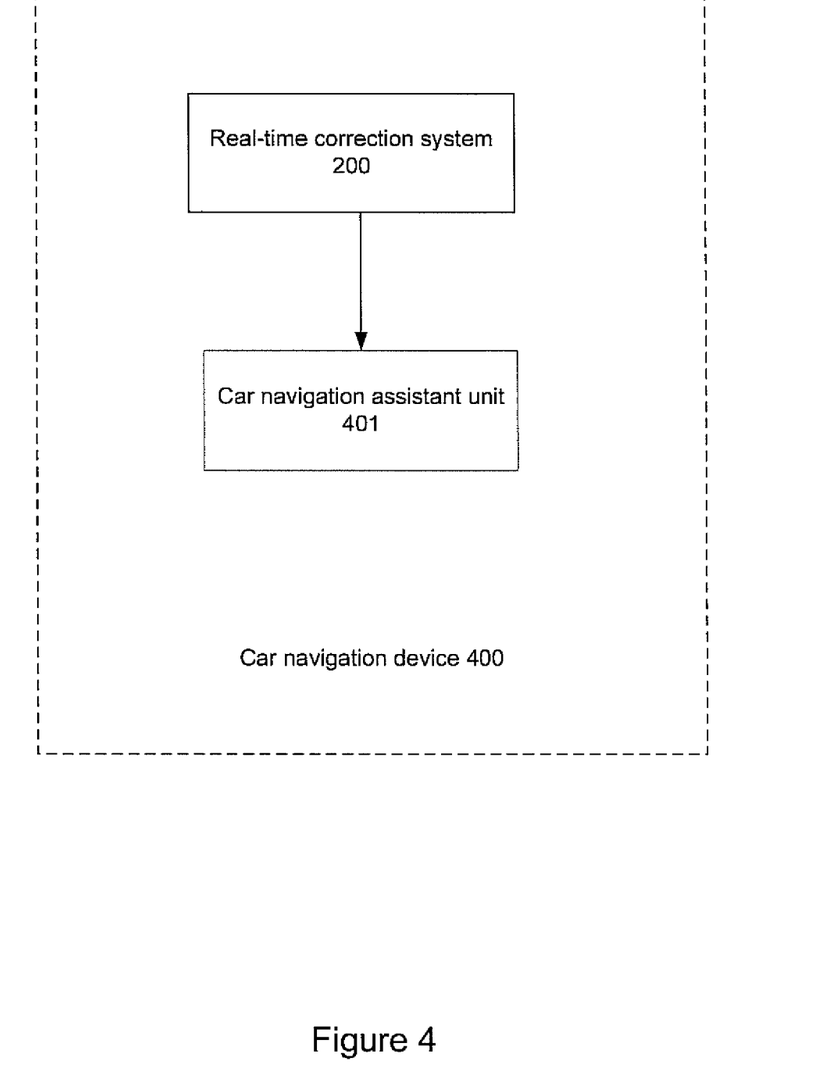
FIG. 4 is a structure diagram of a car navigation device using a real-time video correction system provided by the present invention in accordance with one embodiment.

FIG. 4 is a structure diagram of a car navigation device 400 using a real-time video correction system provided by the present invention in accordance with one embodiment. The car navigation device 400 comprises a real-time video correction system 200 and a driving assistant unit 401. Wherein the driving assistant unit 401 is used for acquiring data from the image recognition unit 206 of the real-time video correction system 200 and assisting driving in accordance with the recognized content, such as, barriers, cars, and people in the full view images. The driving assistant unit 401 provides the safety-related information to the driver so as to remind the driver and assist the driver in driving. Moreover, the car navigation device 400 can be used to drive a car manlessly (or without a human being).

Therefore, the navigation device provided by various embodiments in accordance with the present invention can correct and recognize the images taken by fisheye lens in real-time so as to assist the driver for driving or it can be used to drive a car manlessly (or without a human being).

It should be appreciated that various modifications, adaptations and alternative embodiments thereof may be made within the scope and spirit of the present invention. The invention is further defined by the following claims.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A system comprising:
    at least one wide-angle camera;
    a video correction unit for acquiring video data from the at least one wide-angle camera and correcting the video data;
    a video merging unit for acquiring corrected video data from the video correction unit and merging the corrected video data; and
    an image recognition unit for acquiring video from the video merging unit and performing image recognition to the video to recognize a person.

2. The system of claim 1, wherein the at least one wide-angle camera comprises:
    a first fish-eye camera; and
    a second fish-eye camera.

3. The system of claim 2, wherein the first fish-eye camera and the second fish-eye camera are positioned to take a full view around a vehicle.

4. The system of claim 2, wherein the first fish-eye camera is for taking video of at least 180 degrees.

5. The system of claim 4, wherein the second fish-eye camera is for taking video of at least 180 degrees.

6. The system of claim 2, wherein the video correction unit comprises:
    a first video correction module for acquiring and correcting video data from the first fish-eye camera.

7. The system of claim 6, wherein the video correction unit comprises:
    a second video correction module for acquiring and correcting video data from the second fish-eye camera.

8. The system of claim 1, wherein the image recognition unit comprises a computing ability of 100 giga floating-point operations per second (GFLOPS) and above.

9. The system of claim 1, wherein the image recognition unit uses graphics processing units.

10. The system of claim 1, wherein video merging unit for merging the corrected video data into a full view video around a vehicle.

11. A car navigation device comprising:
    at least one wide-angle camera;
    a video correction unit for acquiring video data from the at least one wide-angle camera and correcting the video data;
    a video merging unit for acquiring corrected video data from the video correction unit and merging the corrected video data;
    an image recognition unit for acquiring video from the video merging unit and performing image recognition to the video to recognize a barrier; and
    a driving assistant unit for acquiring data from the image recognition unit and assisting driving in accordance with the recognized content.

12. The device of claim 11, wherein the at least one wide-angle camera comprises:
a first fish-eye camera; and
a second fish-eye camera.

13. The device of claim 12, wherein the first fish-eye camera and the second fish-eye camera are positioned to take a full view around a vehicle.

14. The device of claim 12, wherein the first fish-eye camera is for taking video of at least 180 degrees and the second fish-eye camera is for taking video of at least 180 degrees.

15. The device of claim 14, wherein the video correction unit comprises:
a first video correction module for acquiring and correcting video data from the first fish-eye camera; and
a second video correction module for acquiring and correcting video data from the second fish-eye camera.

16. The device of claim 11, wherein the image recognition unit comprises a computing ability of 100 giga floating-point operations per second (GFLOPS) and above.

17. A system comprising:
at least one wide-angle camera for taking a full view around a vehicle;
a video correction unit for acquiring video data from the at least one wide-angle camera and correcting the video data;
a video merging unit for acquiring corrected video data from the video correction unit and merging the corrected video data into full view video around the vehicle; and
an image recognition unit for acquiring the full view video from the video merging unit and performing image recognition to the full view video to recognize a barrier.

18. The system of claim 17, wherein the at least one wide-angle camera comprises:
a first fish-eye camera; and
a second fish-eye camera.

19. The system of claim 17, wherein the first fish-eye camera is for taking video of at least 180 degrees.

20. The system of claim 17, wherein the image recognition unit comprises a computing ability of 100 giga floating-point operations per second (GFLOPS) and above.

* * * * *